(12) United States Patent
Wilcken et al.

(10) Patent No.: US 7,230,227 B2
(45) Date of Patent: Jun. 12, 2007

(54) LENSLET/DETECTOR ARRAY ASSEMBLY FOR HIGH DATA RATE OPTICAL COMMUNICATIONS

(75) Inventors: Stephen K. Wilcken, Seattle, WA (US); Jonathan M. Saint Clair, Seattle, WA (US)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 10/961,173

(22) Filed: Oct. 8, 2004

(65) Prior Publication Data

US 2006/0076473 A1   Apr. 13, 2006

(51) Int. Cl.
*H03F 3/08* (2006.01)
(52) U.S. Cl. .............................. 250/214 A; 250/208.2; 398/202; 330/308
(58) Field of Classification Search ............ 250/214 A; 398/202; 330/308
See application file for complete search history.

(56) References Cited

U.S. PATENT DOCUMENTS

| | | | |
|---|---|---|---|
| 4,282,527 | A | 8/1981 | Winderman et al. |
| 4,477,814 | A | 10/1984 | Brumbaugh et al. |
| 5,034,997 | A | 7/1991 | Iwasaki |
| 5,214,438 | A | 5/1993 | Brusgard et al. |
| 5,327,149 | A | 7/1994 | Kuffer |
| 5,343,033 | A * | 8/1994 | Cain ........................ 250/208.2 |
| 5,479,595 | A | 12/1995 | Israelsson |
| 5,760,942 | A * | 6/1998 | Bryant ........................ 398/208 |
| 6,049,593 | A | 4/2000 | Acampora |
| 6,285,481 | B1 | 9/2001 | Palmer |
| 6,307,521 | B1 | 10/2001 | Schindler et al. |
| 6,567,200 | B1 * | 5/2003 | Pammer et al. ............. 398/202 |

(Continued)

FOREIGN PATENT DOCUMENTS

WO   WO 02/32020   4/2002

OTHER PUBLICATIONS

Tao, et al. "Wideband fully differential CMOS transimpedance preamplifier," *Electronics Letters* 39(21): Oct. 16, 2003; 2 pages.

(Continued)

*Primary Examiner*—Thanh X. Luu
*Assistant Examiner*—Stephen Yam
(74) *Attorney, Agent, or Firm*—Timothy K. Klintworth; Wildman, Harrold, Allen & Dixon, LLP

(57) ABSTRACT

An assembly is provided that may be used in high data rate optical communications, such as free-space communication systems. The assembly may include a main optical receiver element and a lenslet array or other optical element disposed near the focal plane that collects an optical signal and focuses that signal as a series of optical signal portions onto a photodetector array, formed of a series of InGaAs photodiodes, for example. The electrical signals from the photodetectors may be amplified using high bandwidth transimpedance amplifiers connected to a summing amplifier or circuit that produces a summed electrical signal. Alternatively, the electrical signals may be summed initially and then amplified via a transimpedance amplifier. The assembly may be used in remote optical communication systems, including free-space laser communication environments, to convert optical signals up to or above 1 Gbit/s or higher data rates into electrical signals at 1 Gbit/s or higher data rates.

25 Claims, 4 Drawing Sheets

U.S. PATENT DOCUMENTS

| | | | | |
|---|---|---|---|---|
| 6,618,125 | B2* | 9/2003 | Stann | 356/5.09 |
| 6,834,165 | B2* | 12/2004 | Feng | 398/202 |
| 6,983,110 | B2* | 1/2006 | Buckman et al. | 398/212 |
| 2001/0026390 | A1* | 10/2001 | Braun | 359/189 |
| 2002/0109076 | A1* | 8/2002 | Tochio et al. | 250/214 SW |
| 2005/0047801 | A1* | 3/2005 | Schrodinger | 398/202 |
| 2005/0218299 | A1* | 10/2005 | Olsen et al. | 250/214 A |

OTHER PUBLICATIONS

Oh, et al. "A 2.5Gb/s CMOS Transimpedance Amplifier Using Novel Active Inductor Load," 27th European Solid-State Circuits Conference, Villach, Austria, Sep. 18-20, 2001.

Ambundo, et al. "Fully Integrated Current-Mode Subaperture Centroid Circuits and Phase Reconstructor," 10th NASA Symp. VLSI Design, Albuquerque, NM Mar. 2002.

Ribak, et al. "A fast modal wave-front sensor," Optics Express 9(3):152-157 (2001).

"New Paint Compounds Provide Early Detection of Corrosion to Aircraft"; AFSOR: Research Highlights Jul./Aug. 1999.

Ballard, et al., "MTI Focal Plane Assembly Design and Performance" SPIE—Imaging Spectrometry V, Denver, CO (US), Jun. 17, 1999.

* cited by examiner

LENSLET/DETECTOR ARRAY ASSEMBLY FOR HIGH DATA RATE OPTICAL COMMUNICATIONS

FIELD OF THE INVENTION

The present disclosure generally relates to optical communications and, more particularly, to optical detector arrays that convert an unfocused or blurred spot comprising an optical signal into an electrical signal by summing signals from detectors forming the array.

BACKGROUND OF THE RELATED ART

Optical communication is becoming the preferred method for secure, high-bandwidth communications. Fiber-based communication systems, for example, are used in environments where the access points are known and fixed, and free-space communication systems are used in remote applications where access points may vary. For the latter systems, compact, lightweight, field deployable receivers are desired. Yet, the size of existing communications equipment has limited the effectiveness of such devices.

To understand the problems with free-space communications systems, one may look to the environments in which these systems operate. In a standard configuration, a laser transmitter produces an information carrying laser beam that transmits that signal through air. A remote user then uses an optical receiver to detect and demodulate that signal, to obtain an electrical rendition of the original laser signal. Over great travel distances, however, the original laser beam will expand and distort in response to anomalies in the air medium through which the beam travels. Turbulence in the atmosphere, for example, may distort the laser beam and produce a twinkling or blurring effect that represents changes in intensities and phase across the laser beam wavefront.

Additionally, atmospheric turbulence and poor optical quality receivers prevent the laser beam from being focused to a point at the remote location. Rather, the laser beam is only focused down to a blurred spot by the receiver. In other words, although the optical beam may originate from a laser point source, in free-space communication systems, that laser point source is imaged to a two-dimensional blur spot at the remote receiver.

As a result of this blur spot, a larger detector is needed to collect the available energy in the laser signal. In fact, in remote applications, there is so much signal intensity loss over the propagation path that it is desirable to collect as much of the received optical signal as possible, which means that larger diameter optical receivers must be used. Larger optical receivers, however, increase weight and reduce portability—two things undesirable for remote deployable receivers. Larger detectors also slow receiver responsiveness, because the intrinsic capacitance of larger detectors is larger, and scales with the area of the detector which means larger parasitic effects and longer response times. These performance limitations also adversely affect the bandwidth (and thus operating data rates) of optical receivers, preventing them from being used in high data rate applications.

SUMMARY OF THE INVENTION

An embodiment of the invention is an optical device for converting optical energy extending over a two-dimensional spot into electrical energy. The optical device may include: a focal plane assembly; a photodetector array having a plurality of photodetectors each positioned to collect at least a portion of the optical energy from the focal plane assembly; a transimpedance amplifier assembly; and a summing amplifier assembly coupled to the transimpedance amplifier assembly to produce a summed electrical signal representative of the optical energy over the two-dimensional spot.

Another embodiment of the invention includes a method of converting a high-data rate optical signal extending over a two-dimensional spot into a high-data rate electrical signal. The method may include: focusing the optical signal onto a photodetector array; converting the optical signal into a plurality of electrical signals; disposing a transimpedance amplifier assembly to amplify each of the plurality of electrical signals; and summing each of the amplified electrical signals, to produce a summed electrical signal representative of the optical signal over the two-dimensional spot.

A further embodiment of the invention includes a method of converting a high-data rate optical signal extending over a two-dimensional spot into a high-data rate electrical signal. The method may include: focusing the optical signal onto a photodetector array; converting the optical signal into a plurality of electrical signals; disposing a summing amplifier assembly to sum each of the plurality of electrical signals; and disposing a transimpedance amplifier assembly to amplify the sum of each of the plurality of electrical signals, to produce a summed electrical signal representative of the optical signal over the two-dimensional spot.

Some embodiments provide an optical receiver assembly that may be used to collect the largest practical amount of laser energy transmitted across a free-space region from a transmitter. Near the focus of the receiver, the assembly may include an optical element or array of optical elements placed near the detector array that have a size sufficient to capture and further concentrate the optical energy contained in the blurred optical spot. The captured optical energy is focused to a photodetector array that has a series of small photodetection elements of relatively low circuit capacitance. In some examples, InGaAs photodiodes are used. In some examples, the electrical signals from these photodetectors are collected and either summed and then amplified or amplified individually and then summed by a series of high bandwidth transimpedance amplifiers. Different types of transimpedance amplifiers architectures may be used. For example, CMOS fabricated singled-ended or differential transimpedance amplifiers may be used to achieve high bandwidths and thus high data rates, for example 1 Gbit/s or higher. In some examples, the summing circuitry and transimpedance amplification can support data rates high enough to support high-definition modulated information to produce an optical communication that can receive free-space high definition video signals modulated on a laser signal.

Optical assemblies may be used in remote communication environments where signal intensities are generally quite low. Further, the optical assemblies may be used in portable, field-deployed applications along with optical receivers and wavefront correction elements.

The features, functions, and advantages can be achieved independently in various embodiments of the present invention or may be combined in yet other embodiments.

DETAILED DESCRIPTION OF AN EXAMPLE

Figure 1:
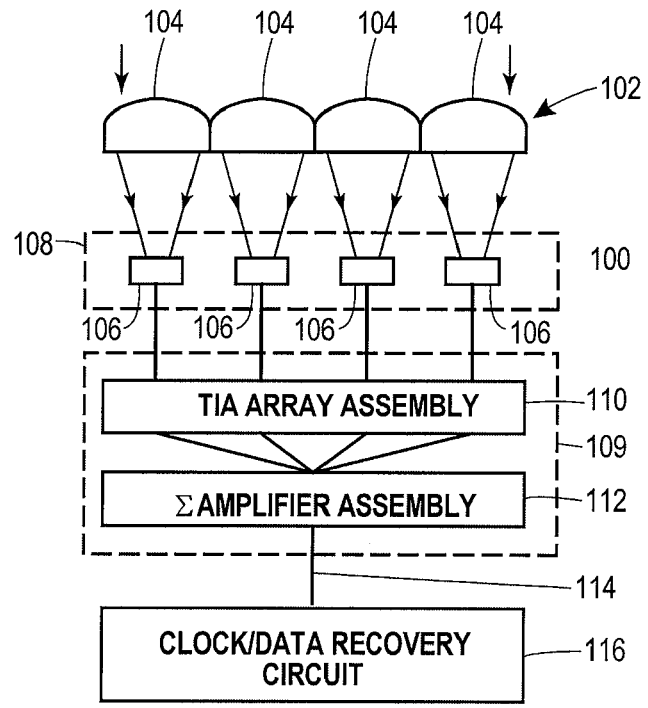
FIG. 1 illustrates a diagrammatic view of an optical device including a focal plane assembly lenslet array, transimpedance amplifier assembly, and summing amplifier assembly that may be used in high data rate optical communications.
Figure 2:
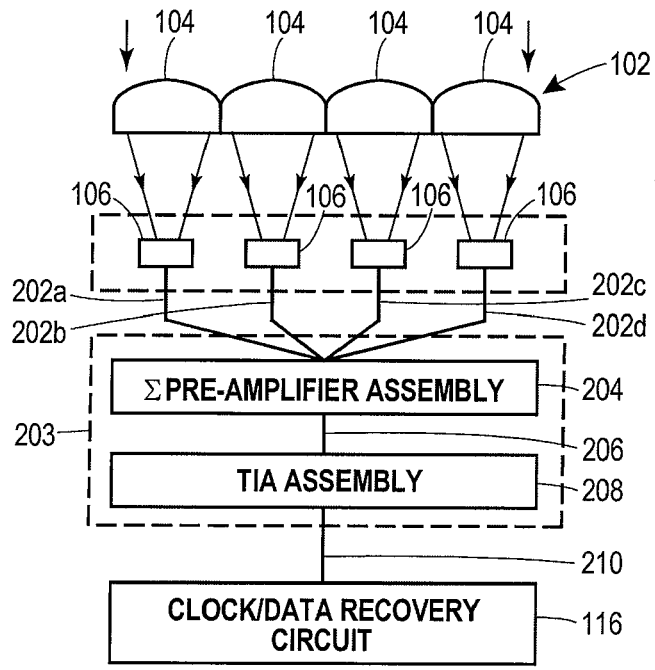
FIG. 2 illustrates a diagrammatic view of another optical device similar to that illustrated in FIG. 1, but with a summing pre-amplifier assembly and a transimpedance amplifier.

To detect optical radiation like laser signals, an optical device may have a focal plane assembly (FPA) able to collect the optical energy and direct that energy to an optoelectronic converter, such as a photodetector array. The electrical signals from the photodetector array may then be applied to amplifiers and analog or digital summing elements to produce a rendition of the original laser signal captured by the FPA. FIGS. 1 and 2 illustrate two different configurations of optical devices that may be used in such high data rate optical communication systems.

FIG. 1 illustrates an optical device 100 that may be used to collect and convert optical signals having data rates of approximately 1 Gbit/s or higher, and in some examples approximately 10 Gbit/s or higher. The device 100 may be used to collect optical energy having a frequency of typically between approximately 1 GHz and 50 GHz, for example.

The device 100 includes an FPA in the form of a lenslet array 102 that may collect optical energy from a laser transmitter, not shown. The array 102, discussed in further detail below, may be a two-dimensional array of lenslets 104 adjacently abutting one another to maximize the amount of optical energy collected by the array 102. The lenslets 104 may be formed of any suitable optically-transparent material. Materials will depend on the wavelength, for example, quartz for visible wavelengths, or silicon for shortwave infrared (SWIR) wavelengths. In the illustrated example, a photodetector element 106 is positioned below each lenslet 104, for example, at a focal distance and performs optical-to-electrical conversion. As explained in further detail below, the photodetectors 106 may be semiconductor PIN or avalanche photodiodes, such as InGaAs, SiGe, InP and InGaP, for example.

The photodetector elements 106 may be formed into a photodetector array 108 that is coupled to a read out integrated circuit (ROIC) 109 which includes transimpedance amplifier assembly 110 and a summing amplifier assembly 112. A transimpedance amplifier (TIA) assembly 110 may include an array of transimpedance amplifiers, one for each photodetector element 106. Example transimpedance amplifiers are described below and, yet, others will be known to persons of ordinary skill in the art. In general, the TIA assembly 110 comprises high data rate transimpedance amplifiers with an RC time constant low enough to amplify electrical signals having Gbit/s data rates while still providing a large enough gain value to produce a summed signal detectable by downstream circuits, such as those used in optical communication systems. To further reduce the RC time constant of the individual transimpedance amplifiers and further improve response time, the size of the corresponding photodetector elements 106 may be decreased to reduce input capacitance at the transimpedance amplifiers.

The TIA assembly 110 is coupled to the high-data rate summing amplifier assembly 112. Each assembly 112 collects (receives or senses) and adds electrical signals from the TIA assembly 110 together to produce a summed electrical signal 114 representative of all optical energy collected by the array 102. The summed signal 114, therefore, may have an electrical energy proportional to the optical energy collected by the array 102 and a high date rate, the same, or substantially similar, to the data rate of that optical energy. The summed signal 114 may be coupled to a display not shown. The ROIC 109 may provide the output signal 114 to a clock/data recovery circuit 116, for example, a microprocessor-based circuit or application specific integrated circuit (ASIC) that may strip modulated data from the electrical signal 114.

FIG. 2 illustrates an optical device 200 similar to device 100 and therefore like reference numerals are used. The lenslet array 102 and photodetector array 108 are positioned to produce electrical signals 202a, 202b, 202c, and 202d, each representative of an optical energy collected by one of the lenslets 104. The signals 202a–202d are collected and summed in a ROIC 203 that, in the illustrated example, includes a summing pre-amplifier 204, for example, a current summing circuit. The summing pre-amplifier 204 produces a summed electrical signal 206 and couples it to a TIA assembly 208, in the ROIC 203 in the illustrated example, that provides high gain and high data rate amplification of the summed electrical signal 206 in the form of an amplified summed electrical signal 210, which may be provided to the clock/data recovery circuit 116, as described above.

Figure 3:
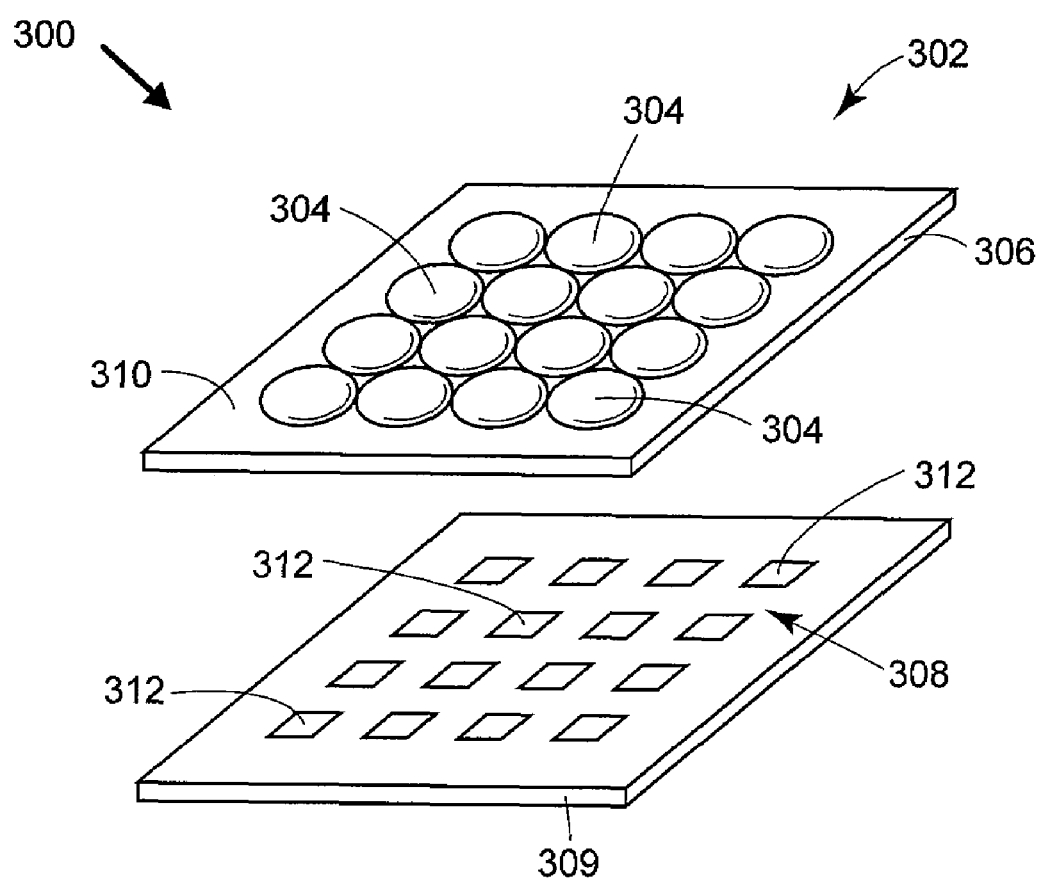
FIG. 3 illustrates an example focal plane assembly (e.g., a lenslet array) and a photodetector array.

An example lenslet array and photodetector assembly 300 is illustrated in FIG. 3. The assembly includes an optical array 302 which may be a plurality of lenslets 304 collectively formed using standard monolithic microlens array fabrication techniques and mechanically mounted to a carrier 306. The lenslets 304 may be spherical, elliptical, cylindrical, or a spherical lenses. Alternatively, lenslets may be Fresnel lenses or graded index-lenses that collect optical energy. Alternatively still, lenslets may be holographic focusing elements that direct collected optical energy to a photodetector. Further, although the lenslets 304 are illustrated as disposed on a top surface 310 of the carrier 306, they may be disposed on a bottom surface of the carrier 306. Even further still, additional focusing elements may be used, either above or below the carrier 306.

In the illustrated example, the collected optical energy is coupled to a photodetector array 308 of substrate 309. The photodetector array 308 is formed of a plurality of photodetectors 312, which may be InGaAs photodetectors having an operating wavelength range above 1 μm, for example. More generally, however, the photodetectors 312 may be any semiconductor PIN or avalanche photodiode, such as an InGaAs, SiGe, InP, and InGaP, or HgCdTe device depending on the operating optical wavelength. The photodiodes may operate over standard optical communication wavelengths such as the 1.55 mm region, although the examples described herein are not limited to these particular wavelengths. For example, military communications may operate at longer wavelengths, such as 10.6 mm, for which HgCdTe detectors may be used. The apparatus 300 is depicted as a 4×4 array, by way of example. The apparatuses described herein may take the form of any M×M or M×N array.

To keep the input capacitance low for the high data rate amplifiers used in the example optical devices, the photodetectors 312 may be fabricated using semiconductor growth and photolithography processes to a size of approximately 100 μm or below, depending on the input capacitance desired. Merely by way of example, an InGaAs detector of 30 μm in diameter may produce a $C_D$ of approximately 100 fF, and a 400 μm detector may produce a $C_D$ of approximately 32 pF, where the smaller the $C_D$, the higher the bandwidth and the faster the response time of the associated summing transimpedance amplifiers. For 10 Gbit/s data rates, a 30 μm diameter photodetector may be preferred, for example.

Figure 4:
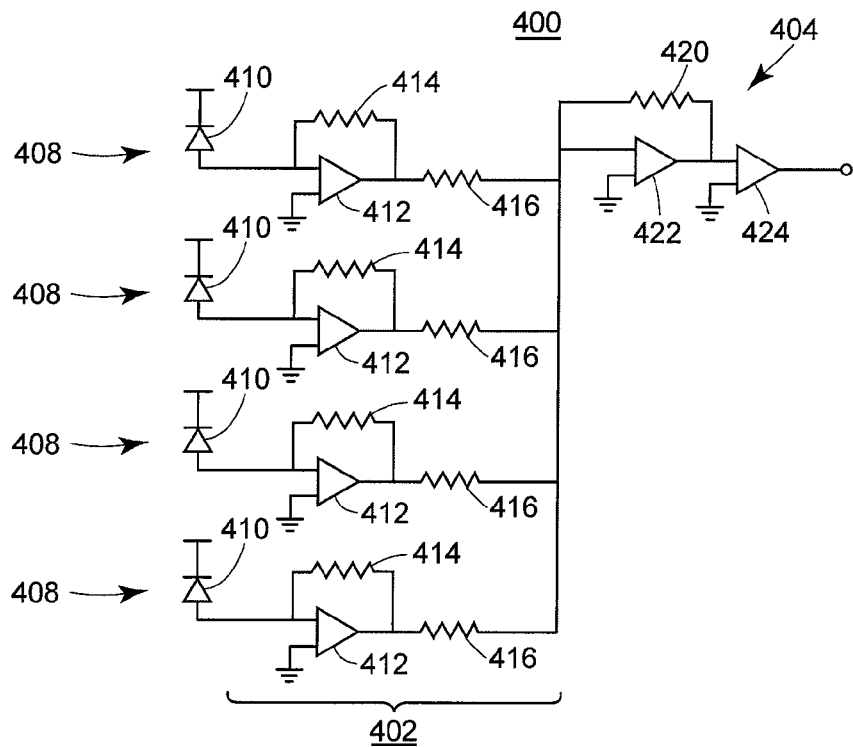
FIG. 4 illustrates a circuit diagram of an example implementation of the transimpedance amplifier assembly and summing amplifier assembly of FIG. 1.

FIG. 4 illustrates an example circuit 400 including a transimpedance array 402 and summing amplifier 404 that may be used in the configuration of FIG. 1. The array 402 includes a plurality of transimpedance amplifiers 406, which in the illustrated example are identical, and thus labeled with common reference numerals. Each amplifier 106 may be part of a receiver element 408 that also includes a photodetector element, e.g., a photodiode 410. Each photodiode 410 is coupled to a terminal of an operational amplifier 412 and shares a node with a feedback resistor 414. The polarity of the terminals on the amplifiers may depend on whether the amplifier is inverting or not. In the illustrated example, the output from each amplifier 412 is coupled through a resistor 416 to a common node 418 providing an input to the summing amplifier 404, which has a feedback resistor 420 coupled across operational amplifier 422. Buffer operational amplifier 424 is also provided at an output terminal in the illustrated example to provide a summed electrical signal to decision circuit or other circuit (not shown).

Figure 5:
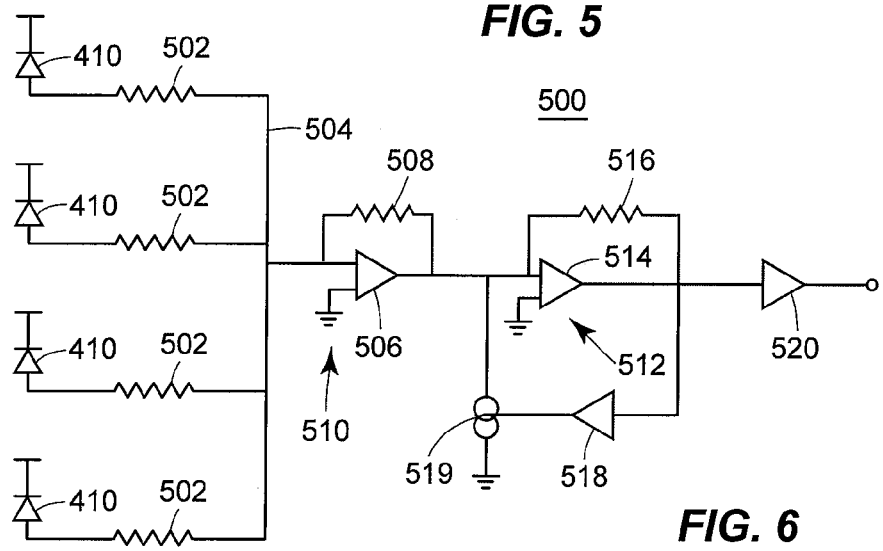
FIG. 5 illustrates a circuit diagram of an example implementation of the summing amplifier assembly and transimpedance amplifier assembly of FIG. 2.

FIG. 5 illustrates another example circuit 500 in which current summing of the signals from the photodiodes (similarly referenced 410) occurs before transimpedance amplifications. Each photodiode is coupled to a resistor 502 coupled to node 504 providing an input to an operational amplifier 506. A feedback resistor 508 provides gain to a summing amplifier 510 formed of elements 506 and 508. A summed electrical signal from the amplifier 510 is provided to a TIA 512 formed of an operational amplifier 514 and feedback resistor 516. In the illustrated example, an optional bias signal may be input to the amplifier 514 for controlling gain in the amplifier. Additionally, a DC restore feedback 518 and AC coupling element 519, or impedance matching or line balancing element, form a feedback to the amp 514. The output from the TIA 512 is provided to a buffer amplifier 520 prior to provision to the decision circuit or other circuit.

Figure 6:
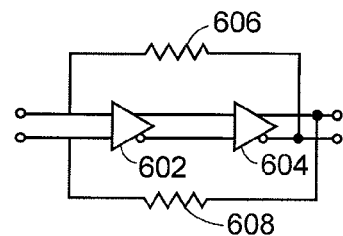
FIG. 6 illustrates a circuit diagram of an example differential transimpedance amplifier.

The transimpedance amplifier may be implemented in a variety of different ways, examples of which are illustrated in FIGS. 4 and 5. FIGS. 4 and 5 illustrate example transimpedance amplifiers having a single-stage, or single-ended configuration. Example implementations may include single-stage buffered amplifiers, with or without additional resistive loads, single-stage cascaded amplifiers, and current amplifiers. Differential transimpedance configurations are also contemplated, such as that illustrated by way of example in FIG. 6, where a two-stage differential transimpedance amplifier 600 is formed of first and second cascaded differential operational amplifiers 602 and 604 and feedback resistors 606 and 608, respectively.

The circuit schematics illustrated are examples and that circuit elements may be removed, substituted, or augmented with additional circuit elements. For example, a bias signal may be used on any operational amplifier described herein to control or adjust gain. Further still, a circuit equalizer, such as an inductive load, may be used to reduce the RC time constant in a transimpedance amplifier, thereby increasing bandwidth response and operating data rates.

Figure 7:
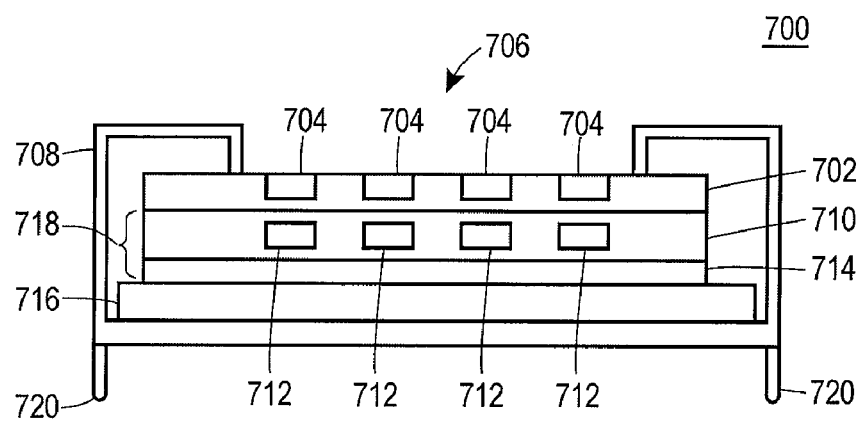
FIG. 7 illustrates a hybridized photodetector array with a read-out integrated circuit, in accordance with an example.

Various fabrication techniques may be used to form the transimpedance amplifier, summing amplifier, and/or clock/data recovery circuit. For example, commercial off-the-shelf elements may be used. Preferably, however, various circuit elements may be formed with CMOS fabrication technology. For example, the photodetector array may be hybridized with a CMOS transimpedance amplifier layer and CMOS summing amplifier to reduce noise and manufacturing costs. An example optical device 700 is illustrated in FIG. 7.

In the illustrated example of device 700, a photodetector array substrate 702 of InGaAs, or other semiconductor material, includes photodiodes 704 that are disposed adjacent a window 706 of a hermetically sealed package 708. The substrate 702 is hybridized with a CMOS TIA layer 710 having a plurality of TIAs 712 formed therein. The CMOS TIA layer 710 has been fabricated along with a CMOS summing amplifier layer 714, with the entire apparatus mounted on a substrate 716, for example a heat sink. The layers 710 and 714 form a ROIC 718. A plurality of pins 720 (only two of which are shown in the illustrated perspective) extend from a bottom of the package 708 for coupling the device 700 and various layer components to control circuitry, not shown.

In an example fabrication, InGaAs detector elements on the order of 50 μm or below die size and 500 μm height may be fabricated into a substrate using semiconductor processing techniques. The photodiode substrate may then be hybridized with a transimpedance amplifier layer (single amplifier or arrayed) and a summing amplifier layer (single amplifier or arrayed) designed using either 0.18 μm or 0.13 μm standard CMOS fabrication processes. The fabrication process may combine multiple layers into a single fabrication layer to improve performance and reduce parasitic effects, as desired. For example, the transimpedance amplifier layer and the summing amplifier layer may be combined into a single CMOS processed layer.

Figure 8:
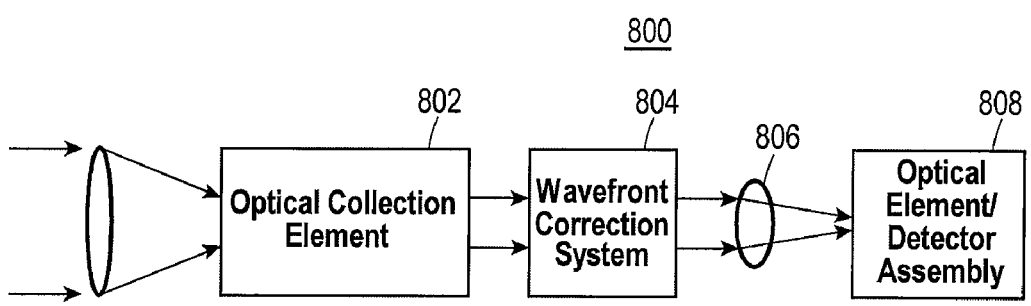
FIG. 8 illustrates a diagrammatic view of an optical system capable of collecting high data rate optical communication signals and detecting those signals via an optical element detector apparatus such as that illustrated in FIGS. 1 and 2.

The optical-to-electrical conversion devices described herein may be used in numerous applications, including free-space optical communications. An example optical receiver 800 including an optical collection element 802 is shown in FIG. 8. The optical collection element 802 may be a focusing lens or antenna system with a focusing mirror. An example deployable antenna system with a focusing mirror. An example deployable antenna system that may he used by remote personnel is described in further detail in U.S. application Ser. No. 10/885,553, filed on Jul. 6, 2004, and entitled "Hybrid RF/Optical Communication System with Deployable Optics and Atmosphere Compensation System and Method" incorporated herein by reference. To correct for turbulence or other affects in the free-space propagation region between the laser transmitter and the receiver 800 and to correct for errors caused by the surfaces of the antenna system or lens, a wavefront correction system 804 is used. The system 804 may include a spatial light modulator and hologram correction film, for example. Example wavefront correction systems are described in US. application Ser. No. 10/885,553. The system 804 may produce a near diffraction-limited beam capable of being focused by a lens 806 to a spot having a diameter of preferably 50 μm or below. The lens 806 focuses the corrected laser energy from the wavefront correction system 804 to an optical element and detector array circuit 808, like those described above.

Numerous example devices and techniques are described, some of which are described in relation to example environments, provided for explanation purposes. The example devices and techniques may be implemented in various ways, beyond the disclosed examples. For example, although free-space optical communication systems are described, the optical elements and photodetector arrays may be used in waveguide-based communication systems. Furthermore, although examples are described in the context of detecting single-wavelength modulated or un-modulated laser energy, the described techniques may be used in multiplexed environments with multiple laser signals, such as, wavelength division multiplexing (WDM) environments. In WDM environments, for example, a prism may be used to disperse different wavelengths to difference receiver arrays.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An optical device for converting optical energy extending over a two-dimensional spot into electrical energy, the optical device comprising:
    a focal plane assembly, wherein the focal plane assembly comprises a lenslet array including a plurality of adjacently-positioned lenslet elements;
    a photodetector array having a plurality of photodetectors each positioned to collect at least a portion of the optical energy from the focal plane assembly;
    a transimpedance amplifier assembly; and
    a summing amplifier assembly coupled to the transimpedance amplifier assembly to produce a summed electrical signal representative of the optical energy over the two-dimensional spot.

2. The optical device of claim 1, wherein the transimpedance amplifier assembly comprises a plurality of transimpedance amplifiers each associated with a different one of the plurality of photodetectors.

3. The optical device of claim 2, wherein the plurality of transimpedance amplifiers are coupled to a common input node of the summing amplifier assembly.

4. The optical device of claim 3, wherein the summing amplifier assembly comprises an operational amplifier in a transimpedance amplifier configuration.

5. The optical device of claim 2, wherein at least one of the plurality of transimpedance amplifiers is in a single-ended configuration.

6. The optical device of claim 2, wherein at least one of the plurality of transimpedance amplifiers is in a differential configuration.

7. The optical device of claim 1, wherein at least one of the plurality of photodetectors is an InGaAs photodiode.

8. The optical device of claim 1, wherein at least one of the plurality of photodetectors is an InGaAs, SiGe, InP, or InGaP photodiode.

9. The optical device of claim 1, wherein at least one of the plurality of photodetectors is an HgCdTe photodiode.

10. The optical device of claim 1, wherein at least one of the plurality of photodetectors is sensitive over at least the visible or near infrared wavelength regions.

11. The optical device of claim 1, wherein at least one of the plurality of photodetectors is sensitive over at least the shortwave infrared, medium-wave infrared, or long-wave infrared wavelength regions.

12. The optical device of claim 1, wherein the summing amplifier assembly is coupled to the plurality of photodetectors to produce the summed electrical signal, and wherein the transimpedance amplifier assembly comprises at least one transimpedance amplifier disposed to amplify the summed electrical signal.

13. The optical device of claim 12, wherein the summing amplifier assembly comprises a current summing amplifier.

14. The optical device of claim 13, wherein the current summing amplifier compnses an operational amplifier in a transimpedance amplifier configuration.

15. The optical device of claim 1, wherein the transimpedance amplifier assembly is a first CMOS assembly and wherein the summing amplifier assembly is a second CMOS assembly.

16. The optical device of claim 15, wherein photodetector array is hybridized with the first and second CMOS assemblies.

17. The optical device of claim 1, wherein the transimpedance amplifier assembly and the summing amplifier assembly have a bandwidth large enough to convert optical energy having a data rate above approximately 1 Gbit/s.

18. The optical device of claim 1, wherein the transimpedance amplifier assembly and the summing amplifier assembly have a bandwidth large enough to convert optical energy having a data rate above approximately 10 Gbit/s.

19. A method of converting a high-data rate optical signal extending over a two-dimensional spot into a high-data rate electrical signal, the method comprising:
    forming an lenslet array including a plurality of lenslets for collecting the optical signal;
    forming a photodetector array including a plurality of photodiodes, wherein the plurality of photodiodes are respectively associated with the plurality of lenslets;
    focusing the optical signal onto the photodetector array;
    converting the optical signal into a plurality of electrical signals;
    disposing a transimpedance amplifier assembly to amplify each of the plurality of electrical signals; and
    summing each of the amplified electrical signals, to produce a summed electrical signal representative of the optical signal over the two-dimensional spot.

20. The method of claim 19, wherein disposing the transimpedance amplifier assembly comprises disposing a plurality of transimpedance amplifiers such that at least one of the plurality of transimpedance amplifiers is associated with at least one of the plurality of photodiodes.

21. The method of claim 19, wherein the transimpedance amplifier assembly is a first CMOS assembly, and further comprising disposing a summing amplifier assembly adjacent the transimpedance amplifier assembly, wherein the summing amplifier assembly is a second CMOS assembly.

22. The method of claim 21, wherein the transimpedance amplifier assembly and the summing amplifier assembly have a bandwidth large enough to convert optical energy having a data rate above approximately 1 Gbit/s.

23. The method of claim 19, wherein the optical signal has a data rate above approximately 1 Gbit/s.

24. An optical device for converting optical energy extending over a two-dimensional spot into electrical energy, the optical device comprising:
- a focal plane assembly:
- a photodetector array having a plurality of photodetectors each positioned to collect at least a portion of the optical energy from the focal plane assembly;
- a transimpedance amplifier assembly; and
- a summing amplifier assembly coupled to the transimpedance amplifier assembly to produce a summed electrical signal representative of the optical energy over the two-dimensional spot, wherein the transimpedance amplifier assembly and the summing amplifier assembly have a bandwidth large enough to convert optical energy having a data rate above approximately 1 Gbit/s.

25. An optical device for converting optical energy extending over a two-dimensional spot into electrical energy, the optical device comprising:
- a focal plane assembly;
- a photodetector array having a plurality of photodetectors each positioned to collect at least a portion of the optical energy from the focal plane assembly;
- a transimpedance amplifier assembly; and
- a summing amplifier assembly coupled to the transimpedance amplifier assembly to produce a summed electrical signal representative of the optical energy over the two-dimensional spot, wherein the transimpedance amplifier assembly and the summing amplifier assembly have a bandwidth large enough to convert optical energy having a data rate above approximately 10 Gbit/s.

* * * * *